United States Patent [19]
Hochreiter et al.

[11] Patent Number: 5,323,206
[45] Date of Patent: Jun. 21, 1994

[54] OPTICAL CHASSIS

[75] Inventors: Eric P. Hochreiter, Bergen; Franklin D. Ehrme; Terrence L. Fisher, Sr., both of Rochester, all of N.Y.

[73] Assignee: Eastman Kodak Company, Rochester, N.Y.

[21] Appl. No.: 943,426

[22] Filed: Sep. 14, 1992

[51] Int. Cl.$^5$ ............................................. G03B 27/62
[52] U.S. Cl. ....................................... 355/47; 355/75; 355/104; 352/228; 352/229; 353/95; 242/71
[58] Field of Search ....................... 355/47, 48, 50, 75, 355/104, 108, 109, 111; 352/228, 229, 230; 353/95; 242/55, 71, 76; 226/76, 83, 84, 85

[56] References Cited
U.S. PATENT DOCUMENTS 3,473,874 10/1969 Hall et al. ............................... 355/52
4,774,553 9/1988 Blanding et al. ........................ 355/75
4,965,632 10/1990 Jadrich et al. .......................... 355/76

Primary Examiner—Michael L. Gellner
Assistant Examiner—D. P. Malley
Attorney, Agent, or Firm—Edward Dugas

[57] ABSTRACT

A chassis for mounting components in a photographic film scanning apparatus cabinet includes a planar base member, and bearing mounts integral with the base member. The mounts sized and configured to hold bearings against which an arcuate wear plate of a gate of the scanning apparatus registers. The gate is configured to move in a pendulum-like manner across the bearings, with an aperture in the planar member for rotatably accommodating a shaft of a drive system for moving the gate in the pendulum-like manner. Mounts integral with the planar base member are provided for holding an optical system of the scanning apparatus. A continuous integral rib is arranged on the rear surface of the planar member is tuned to a higher natural frequency than that of the scanning frequency for vibrationally isolating the planar base member from other components in the cabinet.

12 Claims, 10 Drawing Sheets

OPTICAL CHASSIS

FIELD OF THE INVENTION

The present invention relates to a chassis for a photographic film scanning apparatus and, more particularly, to an optical chassis used in a photographic film scanning apparatus of the type which digitizes images on photographic negative film in a film processing laboratory for storage in a CD format, in which the chassis provides a unitary frame for mounting numerous components so as to combine them into a modular interchangeable unit that vibrationally isolates the chassis from the cabinet of the scanning apparatus, and allows prealignment of the scanning apparatus optics prior to the insertion into the cabinet and maintains such prealignment during virtually the entire operation of the scanning apparatus.

BACKGROUND ART

In conventional scanning apparatus, one approach has been to bolt various mountings for components onto the surface of an optical chassis. More importantly, we have recognized that the chassis used in the known scanning apparatus do not vibrationally and thermally isolate the chassis and its components from the remaining components in the housing, while at the same time, providing for prealignment of the optics so that the optical chassis with all the scanning apparatus (namely the gate, clamp, the gate drive system, the integrating cavity and the lens) can be preadjusted and interchanged with an existing optical chassis in a scanning apparatus.

DISCLOSURE OF THE INVENTION

An object of the present invention is to provide an optical chassis which overcomes the problems and disadvantages encountered with prior art chassis.

Another object of the present invention is to provide an optical chassis which both vibrationally and thermally isolates the scanning apparatus from the cabinet and provides for prealignment of optics in advance of insertion into the cabinet.

A still further object of the present invention is to provide a less massive chassis which serves as a bearing for a scanning gate and reaches thermal equilibrium more quickly so that scanning can take place in steady state over substantially the entire operation of the apparatus such that the desired focus is maintained.

Yet another object of the present invention is to provide a less massive optical chassis while enhancing precise alignment between a gate shaft and the image on the film.

These objects have been achieved in accordance with the present invention by the provision of an optical chassis which is cast or machined in one part with all the mounting surfaces for the scanning apparatus components thereon and with ribs that are tuned to a higher natural frequency so as to isolate the chassis and its components from the cabinet and the remaining apparatus components.

BRIEF DESCRIPTION OF THE DRAWINGS

These and other objects, features and advantages of the present invention will become more apparent from the following detailed description of a presently preferred embodiment of the optical chassis in accordance with the present invention when taken in conjunction with the accompanying drawings wherein.

MODE FOR CARRYING OUT THE INVENTION

Figure 1:
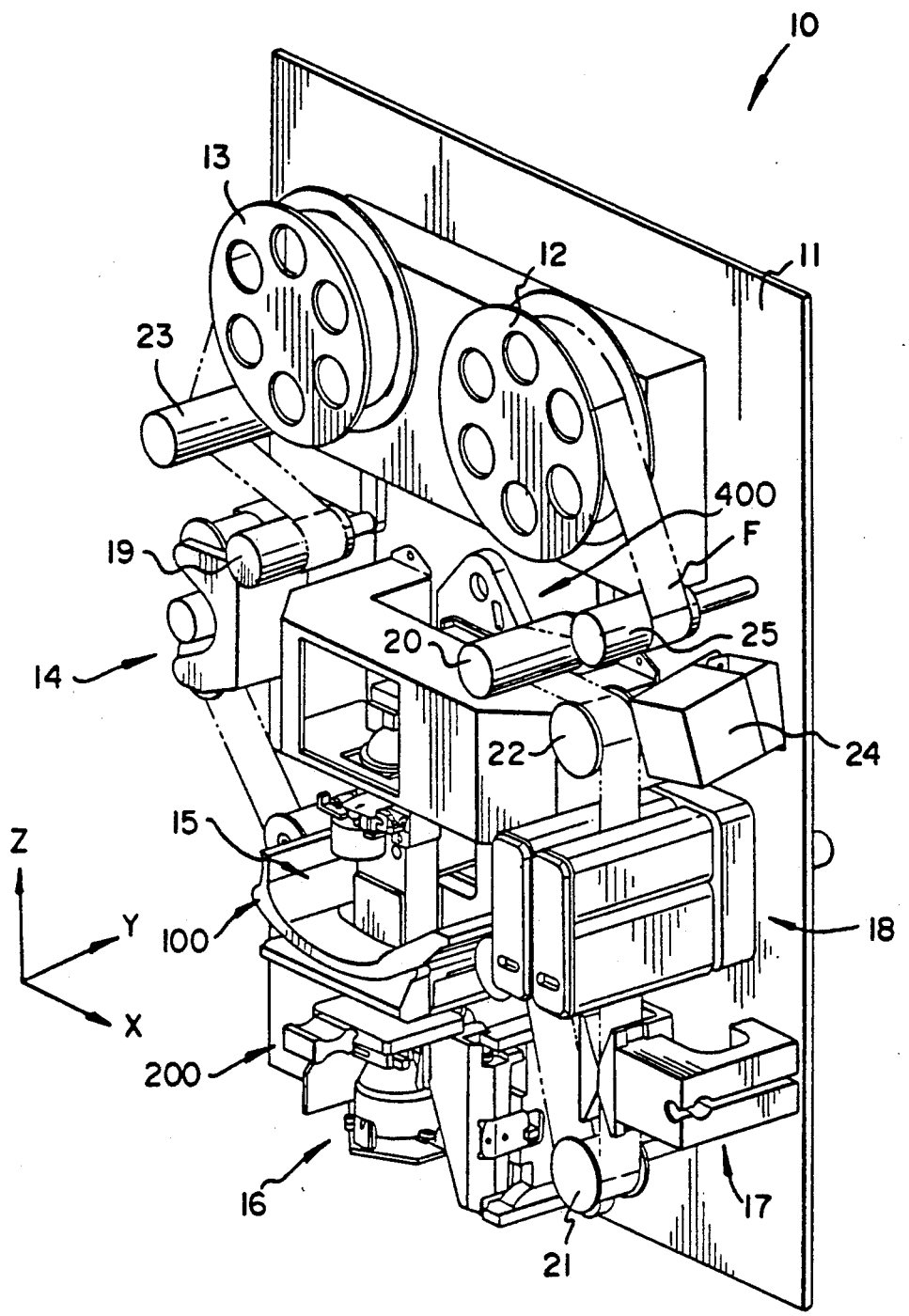
FIG. 1 is a perspective front view of the optical chassis and its scanning components mounted on a frame of the cabinet along with other components such as the reel transport units.
Figure 2:
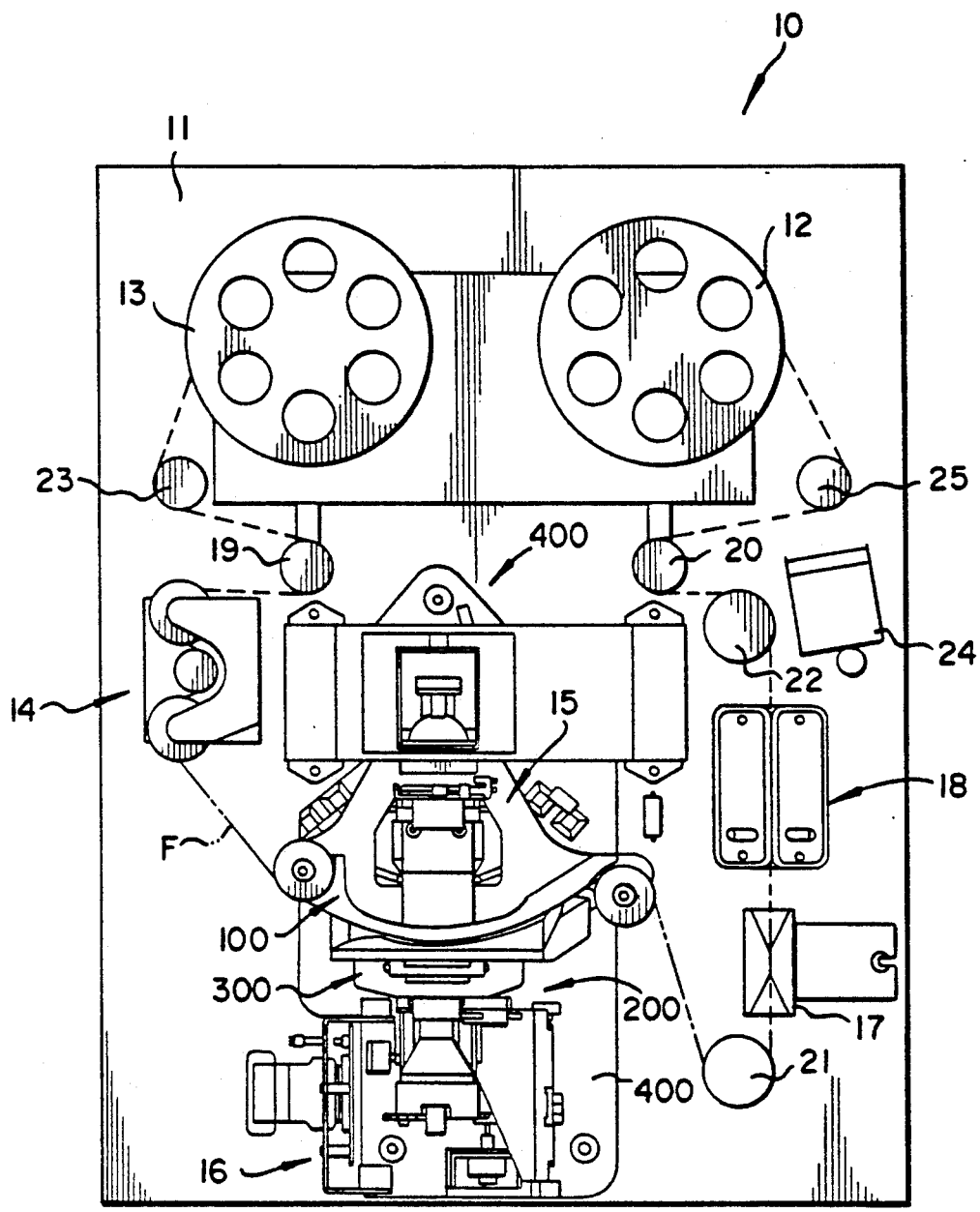
FIG. 2 is a front elevational view of the system shown in FIG. 1.
Figure 3:
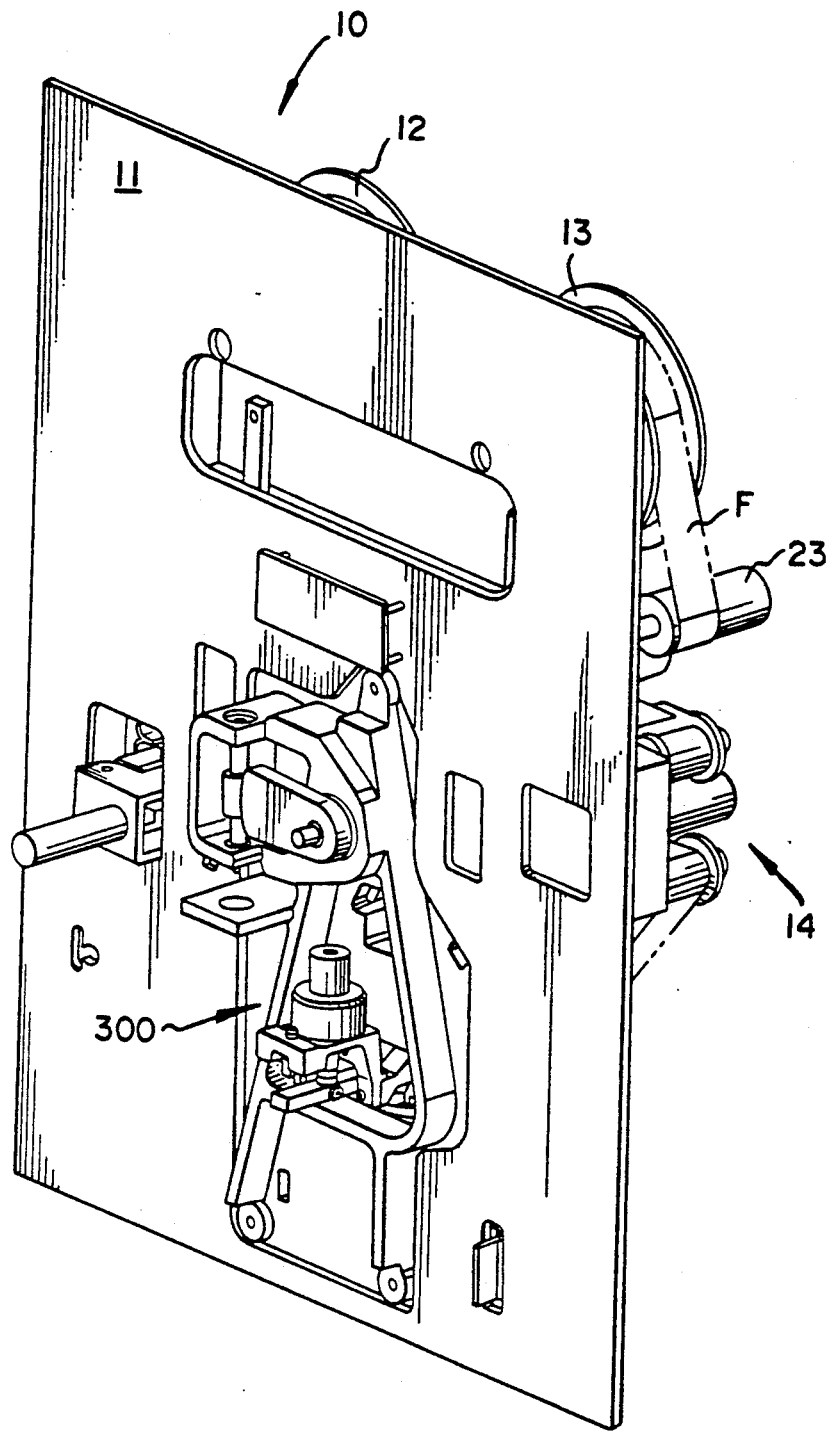
FIG. 3 is a rear perspective view of the system shown in FIG. 1.
Figure 4:
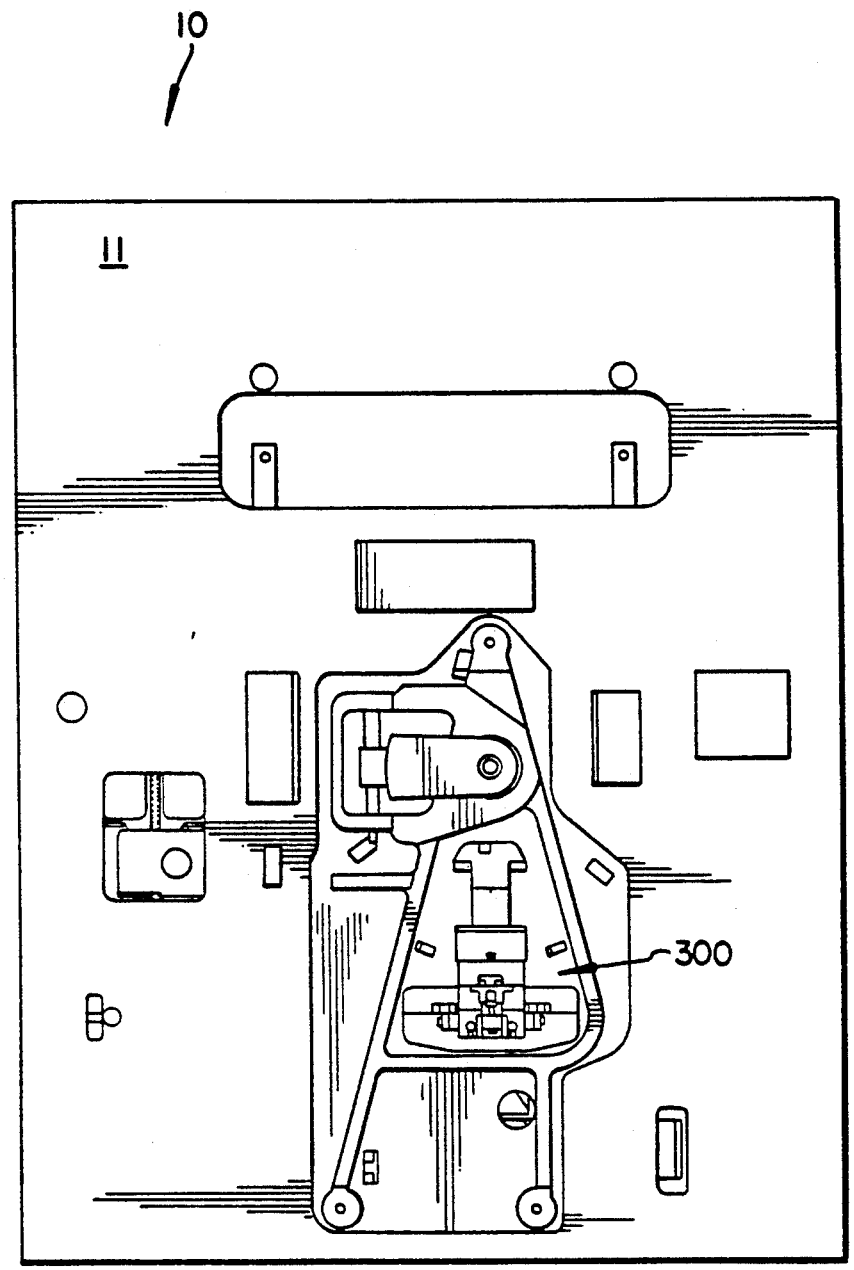
FIG. 4 is a rear elevational view of the system shown in FIG. 3.

Referring now to the drawings and, in particular, to FIGS. 1 and 2, a photographic negative film scanning apparatus for scanning and digitizing images on frames of the film is designated generally by the numeral 10. The apparatus 10 includes a board support member or 11 on which are mounted conventional film transport 12, 13, a capstan drive 14, an integrating cavity 15, a conventional imager with imaging board designated generally by the numeral 16, a DX bar code reader 17 for determining the type of film being scanned, a film cleaning apparatus 18, a bar code reader 24 for reading order processing data, and spring-biased tension rollers 19, 20 to maintain the film at a substantially constant tension during the high resolution scanning pass. In addition, other idler rollers 21, 22, 23 and 25 are mounted on the board 11 to maintain a smooth but tight path for the film F shown in long and short dash lines. A gate 100 mounted on an optical chassis 400 and seen in more detail in FIG. 3-9, is rotated, during the high resolution scanning pass in an arc of about 6½° on both sides of a vertical axis constituting an initializing position in which the gate assumes during the low resolution operation. The film F which is supplied from reel 12 shown in FIGS. 1 and 2 is advanced by the capstan mechanism 14 by pulling the film F from the supply reel 12 over the gate 100 and onto the take-up reel 13. It will be understood, of course, that the capstan mechanism 14 can be disposed on the right-hand side of the scanning apparatus to push the film F over the gate 100 without departing from the scope of the present invention.

A lens protector device 200 is provided in close proximity to the LCM optical scanning mechanism to protect its lens from dust and the like as more fully described in co-pending application Ser. No. 943,424 entitled LENS PROTECTOR DEVICE, filed in the names of Tomi Lahcanski, et al. on Sep. 14, 1992. Inasmuch as the details of the lens protecting device 200 are not necessary for an understanding of the present invention, further details with respect thereto are dispensed with and the contents of said application are incorporated by reference herein for background as to the overall construction of the scanning apparatus.

Figure 5:
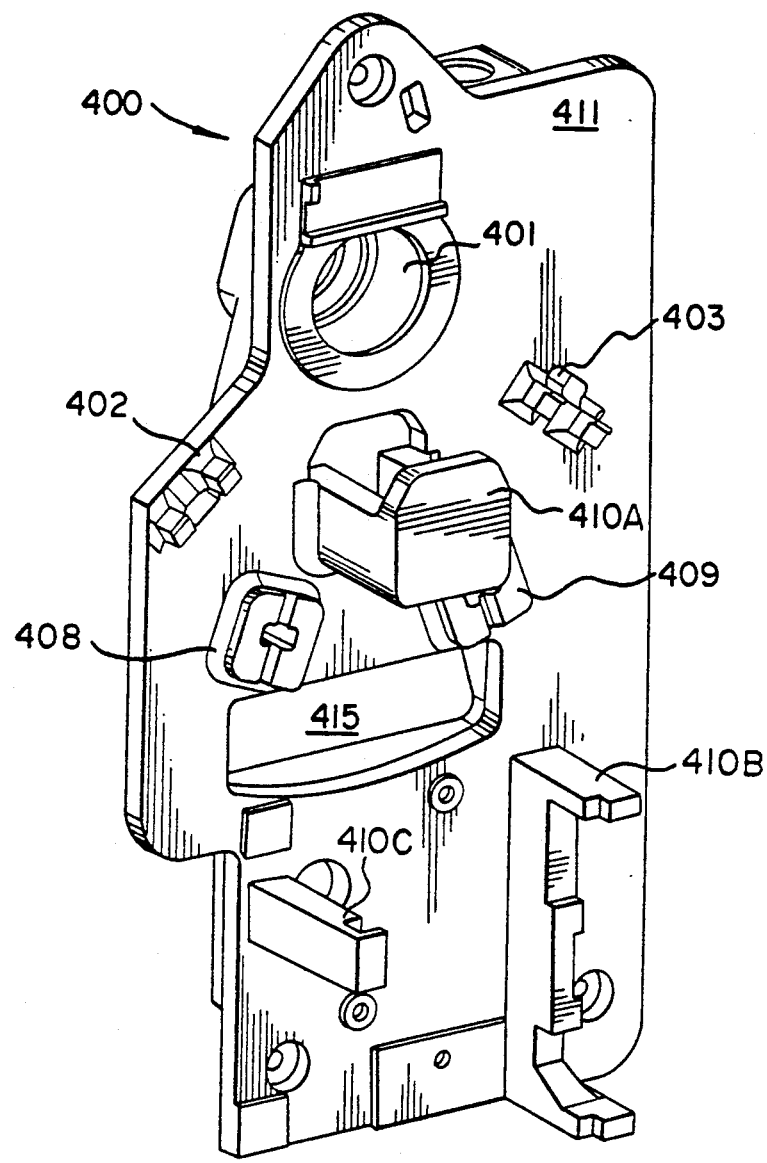
FIG. 5 is an isolated view of the optical chassis in accordance with the present invention with certain of the scanning components removed therefrom.

Referring now to FIG. 5, the optical chassis 400 can be in the form of, for example, a cast aluminum part in which the mounting for the integrating cavity 15, the mountings 402, 403 for the gate sensors, and the mountings 408, 409 for the bearings 404, 405 (FIG. 7), respectively for registration with a wear plate on the gate 100 are formed integrally with the vertical base 411 of the optical chassis 400. Thus, the reinforced optical chassis serves as a precision bearing mounting surface to maintain the most precise alignment of the gate with the imaging unit 16 possible.

Figure 6:
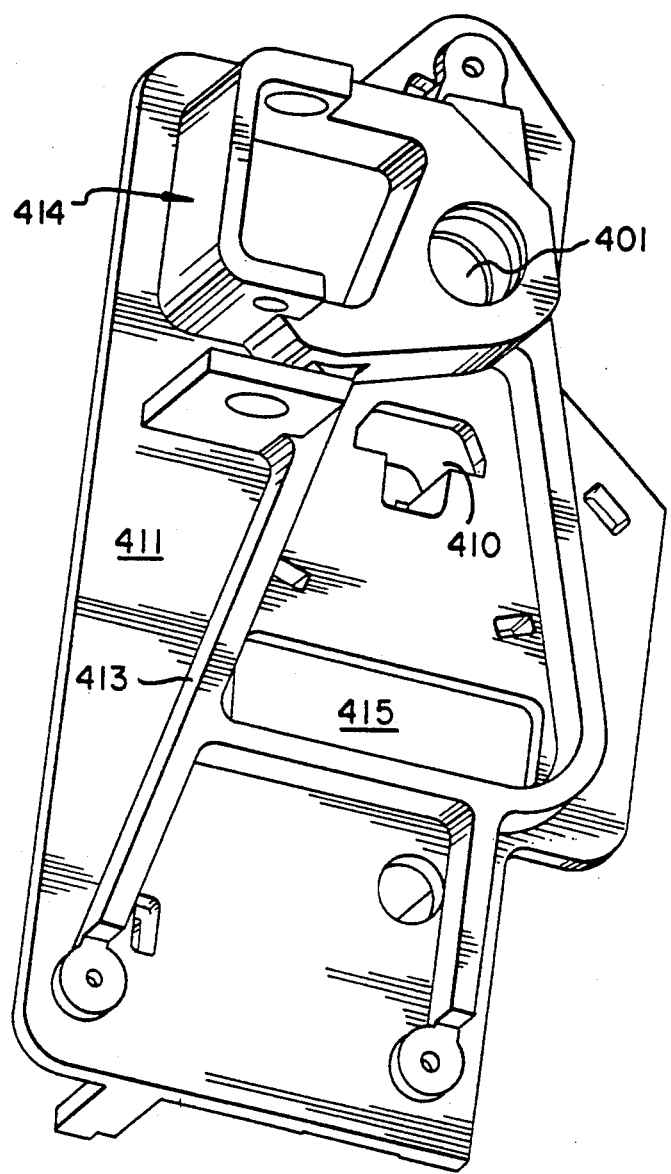
FIG. 6 is a rear perspective view of the optical chassis shown in FIG. 5 illustrating the tuning rib for vibration isolation.
Figure 7:
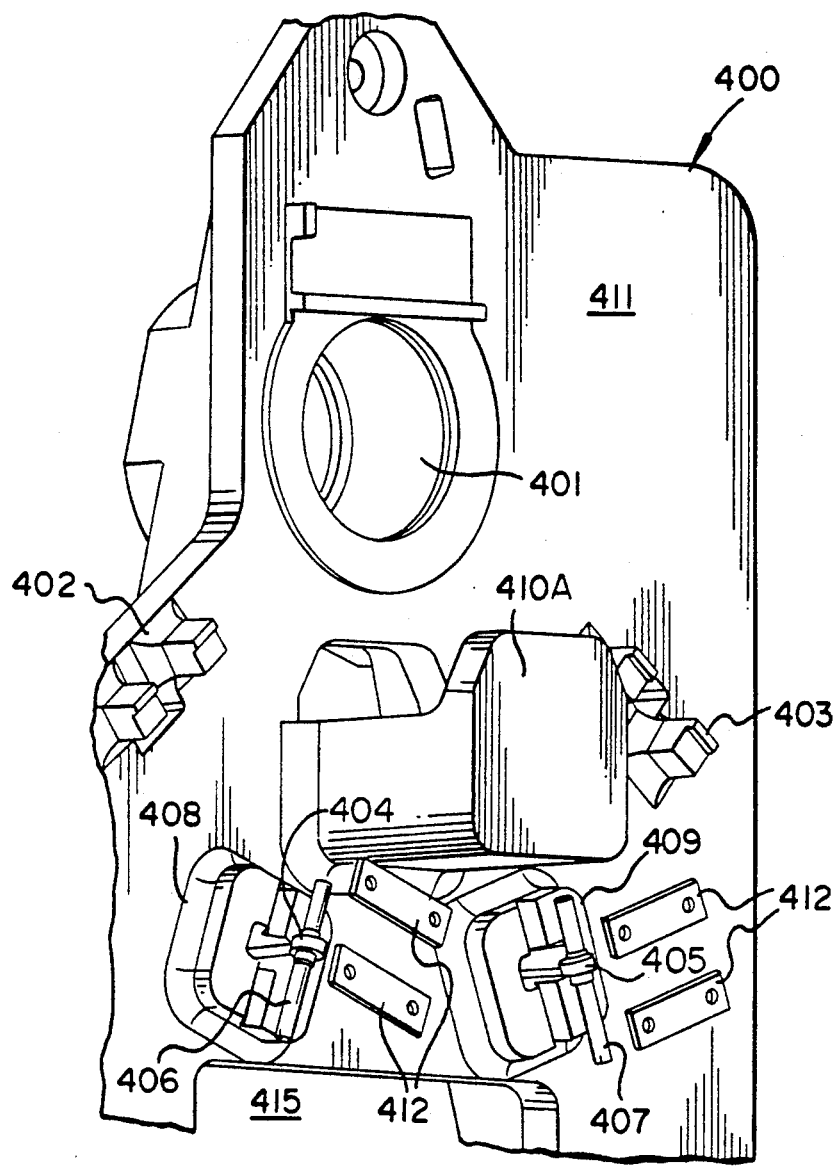
FIG. 7 is a perspective view similar to FIG. 5 but showing only a portion of the optical chassis with the eccentric shafts and bearings for the wear plate of the gate shown in relation to the bearing shaft mounts which are an integral part of the optical chassis.
Figure 9:
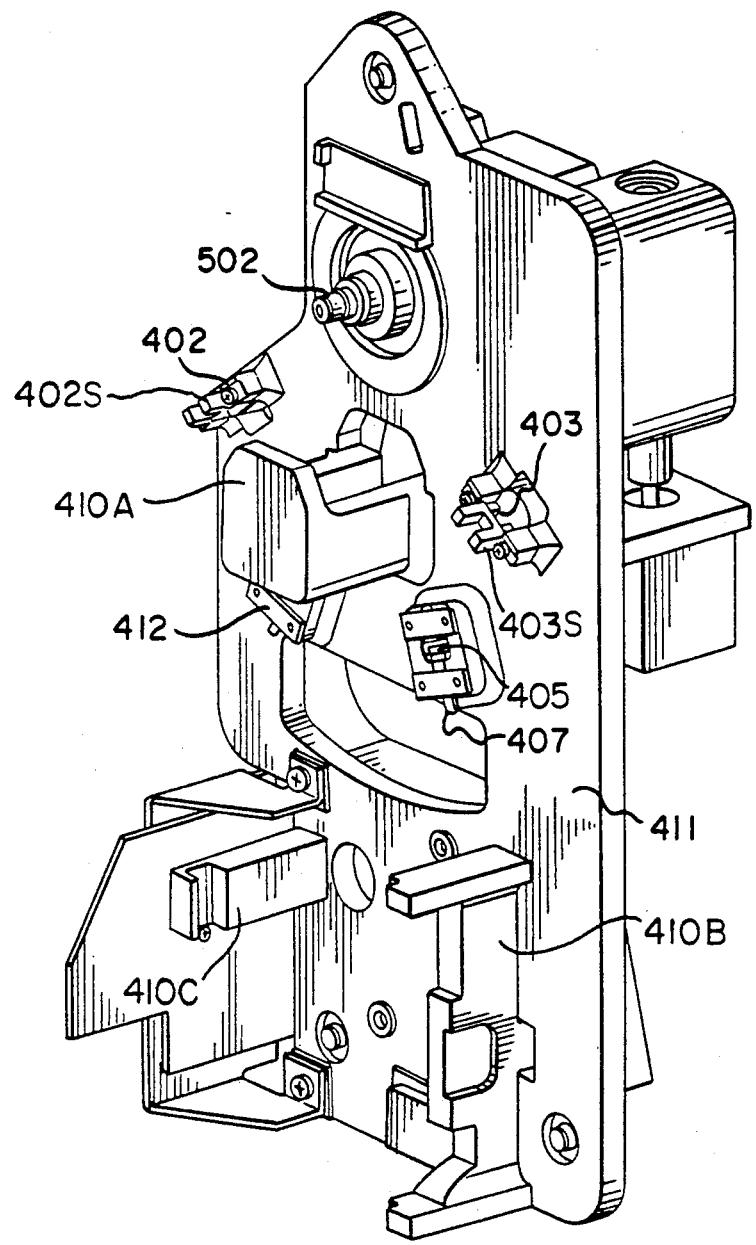
FIG. 9 is a front perspective view of the optical chassis showing the gate drive system and the bearings for the gate wear shaft mounted thereon as well as the gate sensors.

A circular aperture 401 is provided in vertical base 411 (and through a mounting portion 414, as shown in FIGS. 6 and 7) for rotatably accommodating a shaft (502, as shown in FIG. 9) of a drive system for moving the gate 100 in a pendulum-like manner. Also shown in FIG. 5 is a set of mounts 410A, 410B, and 410C, integral with vertical base 411, for holding an optical system of the scanning apparatus, generally designated at 16 in FIG. 1.

On the rear portion of the optical chassis base 411 as shown in FIG. 6, a mounting 414 for the gate drive system can also be integrally cast into the base as well as a continuous rib 413 whose purpose is to isolate the scanning apparatus 10, to which the chasis 400 is attached, as shown in FIG. 1, for example, from the remaining components of the cabinet by being tuned to a higher natural frequency than the scanning frequency. Moreover, any cabinet vibration caused by non-scanning apparatus will not be transmitted to the scanning apparatus to distort the image being scanned and digitized. One of ordinary skill will know the techniques used to configure and construct the rib which in this embodiment is a continuous rib in a roughly A-shape. It will be appreciated, of course, that depending upon the exact design of the optical chassis 400, the materials used in the scanning apparatus 10 and other variables that the shape and size of the rib 413 may change to achieve the higher natural frequency for achieving vibration isolation. The essential criteria are that the rib provide the tuning to the higher natural frequency while giving reinforcement to the chassis to permit the latter to be made less massive. The less massive chassis, in turn, reaches an equilibrium thermal state much more quickly after start-up and thus allows a steady state operation of the scanning apparatus during virtually its entire operation.

It will be further understood that the rib 413, as with the previously mentioned mounting components, is integrally cast into the vertical base 411 of the optical chassis. For ease of illustration, only certain of the components have been shown as being filleted to designate integral casting with the understanding, however, that all the parts shown on the optical chassis of FIGS. 5 and 6 are integrally cast. The overall integral chassis unit thus achieves a stiffness which maintains the focus necessary for high resolution while the less massive chassis allows this focus to be maintained over the span of operations of the scanning apparatus which can be for several hours at a time.

Figure 8:
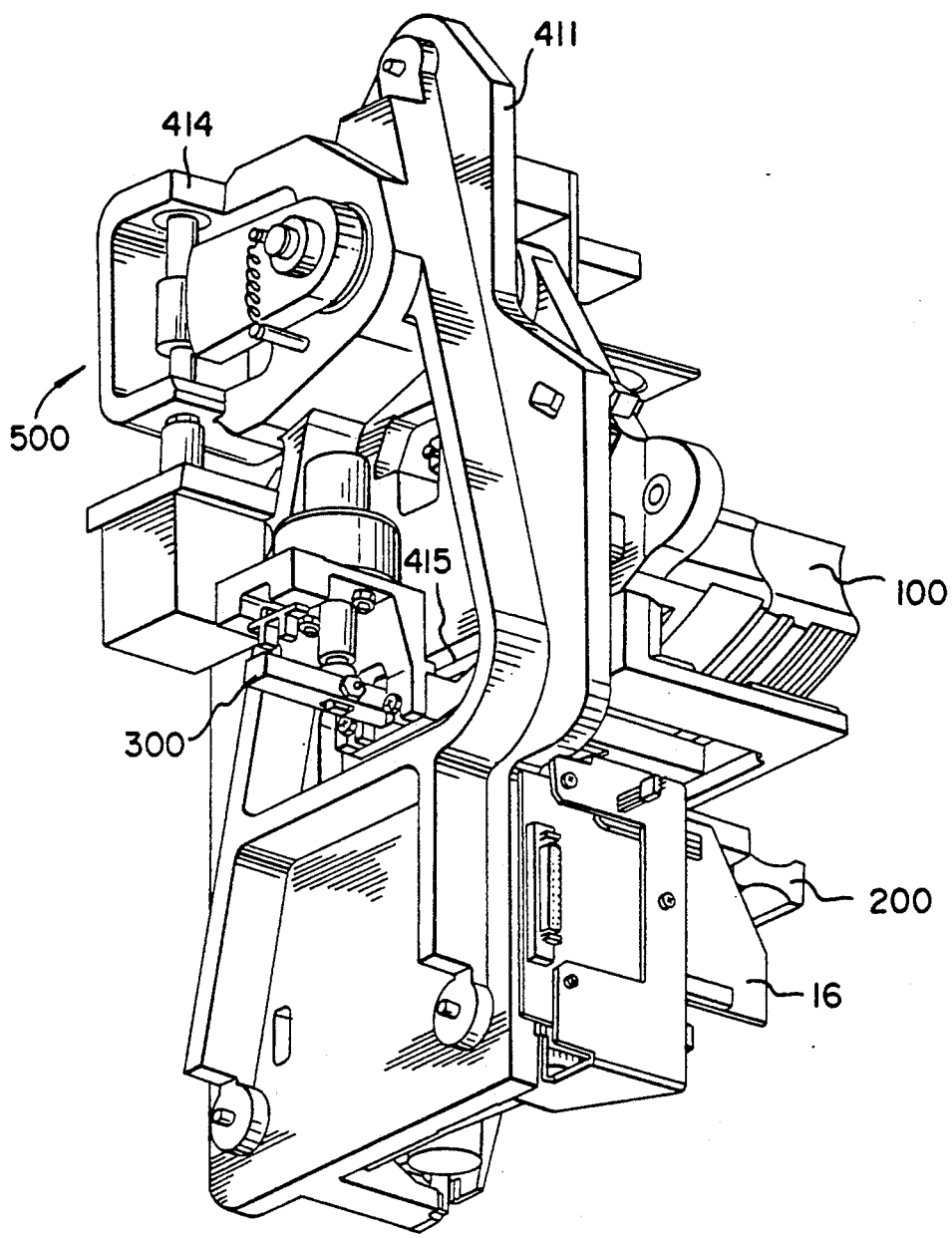
FIG. 8 is a rear perspective view of the optical chassis with the various scanning apparatus components mounted thereon.

FIG. 7 shows in somewhat more detail how gate wear plate bearings 404, 405 and respective eccentric bearing shafts 406, 407 are mounted on the optical chassis with retaining plates 412 being screwed or bolted into the mounting surface. FIG. 8 shows how the gate drive system 500, the details of operation of which are not here relevant, is mounted compactly on the optical chassis 400 on the rear surface at the mounting portion 414. An aperture 415 in the vertical base of the optical chassis 400 is provided to accommodate the solenoid and solenoid mounting plate for the clamp mechanism 300 mounted on the gate 100 for clamping the film to the gate 100 for transportation with the gate. Details of the gate 100 are disclosed in co-pending application Ser. No. 943,425 entitled ARC-SEGMENT-SHAPED GATE FOR PHOTOGRAPHIC FILM SCANNING APPARATUS filed in the names of Eric P. Hochreiter, et al. on Sep. 14, 1992, a description of which is incorporated by reference herein. Likewise, details of the operation of the clamp are described in application Ser. No. 943,423 entitled CLAMPING ARRANGEMENT FOR FILM SCANNING APPARATUS filed in the names of Tomi Lahcanski, et al. on Sep. 14, 1992, a description of which is incorporated by reference herein. The details of the gate drive system are further described in application Ser. No. 943,427 entitled SCANNING APPARATUS GATE DRIVE SYSTEM filed in the names of Eric P. Hochreiter, et al. on Sep. 14, 1992, the details of which are incorporated by reference herein, although not necessary for a full understanding of the optical chassis 400 itself.

FIG. 9 shows the bearing eccentric shafts 406, 407 and their bearings (bearing 406 being visible in FIG. 9) fully mounted on the optical chassis 400, as well as the gate 100 sensors 402S, 403S which detect the end of movement of the gate in a pendulum-like manner during normal scanning operations. Furthermore, the shaft 502 upon which a spherical bearing of the gate 100 is mounted also extends through the front portion of the optical chassis and is part of the gate drive system 500.

Figure 10:
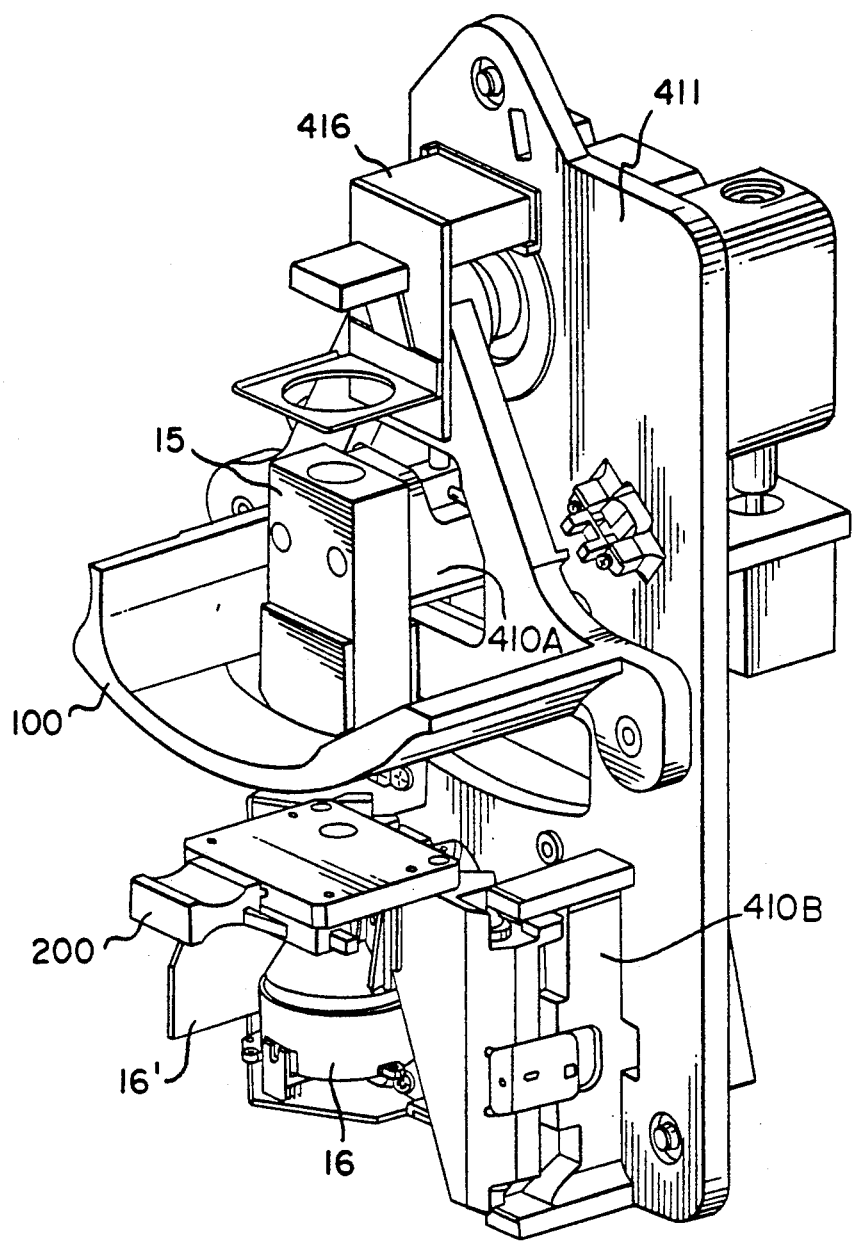
FIG. 10 is a view similar to FIG. 9 but with the gate, integrating cavity and imaging lens unit mounted thereon.

Finally, FIG. 10 shows the optical chassis 400 with the gate (except for idler rollers), integrating cavity 15 which contains a heat generating lamp, imager 16 and imaging board 16' mounted thereon. Thermal isolation of the lamp of the integrating cavity 15 from the chassis 400 is achieved with a phenolic block 416 mounted to the chassis. It will be apparent from this view that the optical chassis 400, in addition to providing superior reinforcement for the scanning apparatus cabinet, provides an integral module which permits prealignment of the scanning apparatus optics prior to insertion of the chassis into the scanning cabinet and also provides interchangeability of the entire scanning apparatus for easier servicing and repair.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A chassis for mounting components in a scanning apparatus cabinet, comprising a planar base member, bearing mounts integral with the base member, and sized and configured to hold bearings against which an arcuate wear plate of a gate of the scanning apparatus registers, the gate being configured to move in a pendulum-like manner across the bearings, an aperture in the planar base member for rotatably accommodating a shaft of a drive system for moving the gate in the pendulum-like manner, mounts integral with the planar base member for holding an optical system of the scanning apparatus, and means on the planar member for vibrationally isolating the planar base member from other components in the cabinet.

2. The chassis according to claim 1, wherein mounts for gate positioning sensors are integrally provided or the planar base member in proximity to the bearing mounts.

3. The chassis according to claim 1, wherein the vibration isolating means comprises a continuous rib tuned to a higher natural frequency than the natural frequency of the scanning frequency.

4. The chassis according to claim 1, wherein the optical system is provided on the planar base member prior to insertion of the planar base member into a support member of said scanning apparatus.

5. The chassis according to claim 1, wherein a mount integral with a rear face of the planar member has the drive system connected therewith.

6. The chassis according to claim 2, wherein the vibration isolating means comprises a continuous rib tuned to a higher natural frequency than the natural frequency of the scanning frequency.

7. The chassis according to claim 2, wherein the optical system is provided on the planar base member prior to insertion of the planar base member into a support member of said scanning apparatus.

8. The chassis according to claim 2, wherein a mount integral with a rear face of the planar base member has the drive system connected therewith.

9. The chassis according to claim 6, wherein the optical system is provided on the planar base member prior to insertion of the planar member into a support member of said scanning apparatus.

10. The chassis according to claim 6, wherein a mount integral with a rear face of the planar base member has the drive system connected therewith.

11. The chassis according to claim 9, wherein a mount integral with a rear face of the planar base member has the drive system connected therewith.

12. The chassis according to claim 1, wherein the chassis constitutes a rigid bearing support to assure precise positioning of the gate relative to the optical system.

* * * * *